Figure 1:
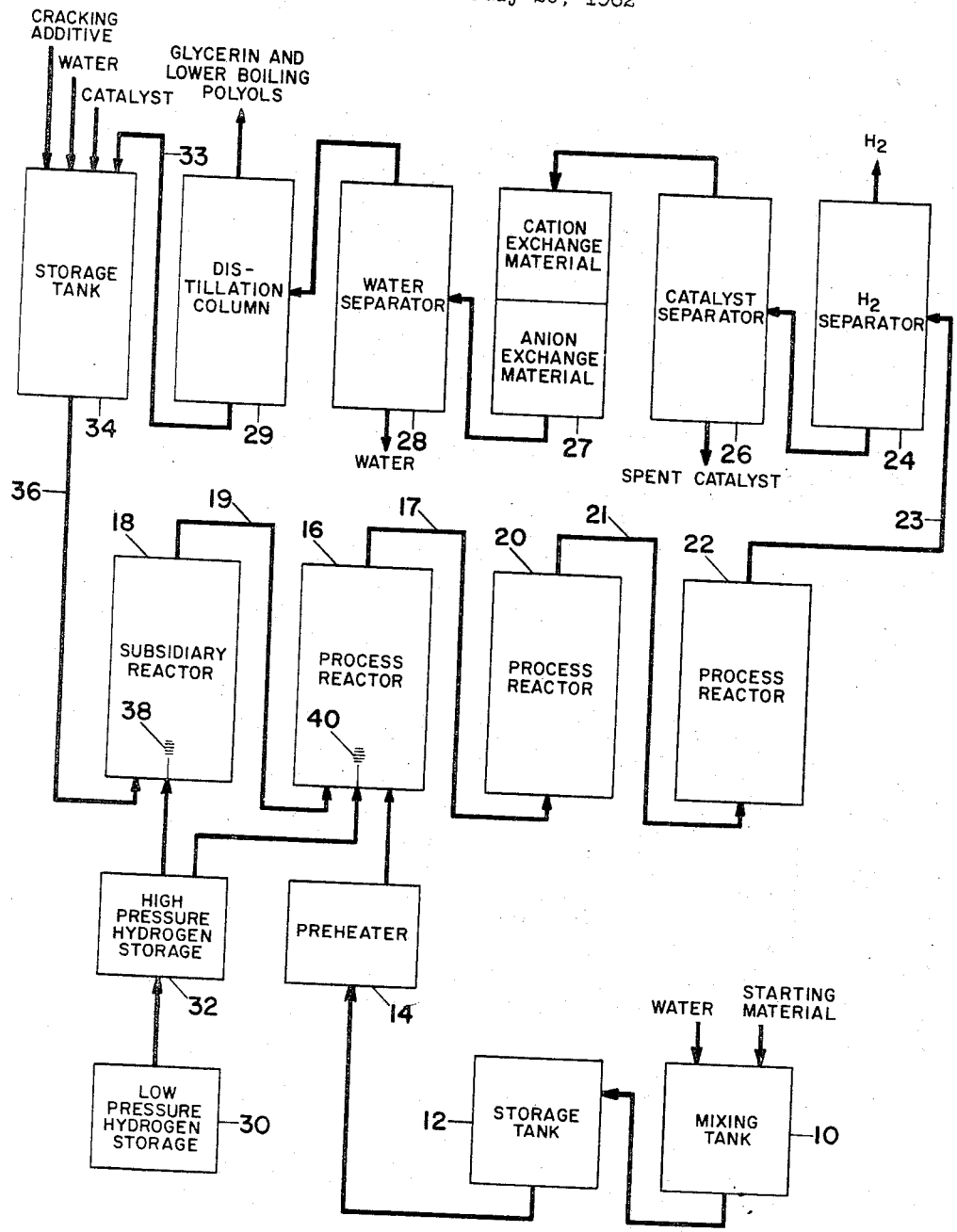

INVENTOR.
Leo Kasehagen

United States Patent Office 3,341,609
Patented Sept. 12, 1967

3,341,609
DUAL FEED HYDROGENOLYSIS PROCESS FOR GLYCERIN AND GLYCOLS USING FEED OF REDUCIBLE SUGAR WITH HYDROGENOLYSED RESIDUE OF PROCESS
Leo Kasehagen, West Chester, Pa., assignor to Atlas Chemical Industries, Inc., Wilmington, Del., a corporation of Delaware
Filed July 20, 1962, Ser. No. 211,219
10 Claims. (Cl. 260—635)

The present invention relates to a continuous process for producing glycerin and glycols from a feed material of reducible sugars or other related carbohydrates, and more particularly to a hydrogenolysis process wherein a portion of the hydrogenolysis product not converted into glycerin or glycols is separated, reexposed to hydrogenolysis reaction conditions, and then utilized as additional process feed material.

Hydrogenolysis is the cracking of the carbon to carbon linkage of a molecule with the simultaneous addition of hydrogen to each of the fragments produced by the cracking.

The present process comprises the steps of first reacting a residue of a prior carbohydrate hydrogenolysis process substantially depleted of glycerin and glycols with hydrogen in the presence of a hydrogenation catalyst; second, mixing the product of the beforementioned first step with a feed of reducible sugar and reacting the formed mixture with hydrogen in the presence of a hydrogenation catalyst and a cracking additive to form a hydrogenolysis product, and; separation glycerin and glycols from the latter product leaving another carbohydrate hydrogenolysis residue.

In a preferred manner of performing the present process a continuous feed of reducible sugar or related carbohydrate material is reacted with hydrogen in a process reactor in the presence of a hydrogenation catalyst and a cracking agent at a temperature of between about 200° C. and about 220° C. under a pressure of at least 500 p.s.i. The hydrogenolysis reaction product is continuously removed from the process reactor, and if desired, may be separated into its various useful components by suitable treatment, for example, distillation. A portion of the reaction product not converted to glycerin and glycols is collected and reacted with hydrogen in a subsidiary reactor in the presence of a hydrogenation catalyst and a cracking additive at a temperature of between about 210° C. and about 230° C. and under a pressure of at least 500 p.s.i. The hydrogenolysis product is continuously removed from the subsidiary reactor and utilized as feed material into the process reactor. As used in the present application the terms "continuous" and "continuously" are not intended to exclude operations which are pulsating or somewhat intermittent but which have an overall effect equivalent to a continuous operation.

Feed material

The feed or starting material of the present process is a reducible sugar or related carbohydrate material. Suitable reducible sugars, for example, may be hexoses, such glucose or fructose; or pentoses, such as arabinos or xylose. Suitable related carbohydrates, for example, are starch hydrolyzates and particularly useful as a feed material in the present invention are those hydrolyzates having a dextrose equivalent of at least 70. Preferably the feed material is in solution in order to facilitate easier handling and feeding operations. Water is a suitable solvent and may be used in any convenient concentration. Aqueous solutions of from about 30 to about 80% by weight of feed material are generally satisfactory. Aqueous solutions containing from about 50 to about 70% by weight of feed material are preferred in order to provide a sufficient supply of carbohydrate feed material for the process without an overabundance of water and still maintain a feed material in liquid or slurry form that may be pumped from a supply tank into the reactor. Other solvents such as ethanol or methanol are suited to use in the present process. However, economics dictates that such solvents be recovered from the reaction mixture and reused, whereas if water is used as the carrier no solvent recovery process is required. The hydrogenolysis product from the reactor system is preferably treated to remove ionizable material. Ionizable material, such as spent cracking additive and spent catalyst, present in the hydrogenolysis product frequently interferes with separation of the hydrogenolysis product into its various components. Such material can be expected to interfere with hydrogenolysis reactions and unless removed usually renders the product unsuited as a feed material into a further hydrogenolysis process, for example, as a residue feed material for the subsidiary reactor. Suitably a battery consisting of a bed of cation material and a bed of anion material are utilized to remove ions from the hydrogenolysis product.

Process reactor

The process may conveniently be carried out in apparatus substantially as described in the U.S. Patent 2,642,462. This consists of a series of reactors through which hydrogen is continuously circulated. The apparatus of the '462 patent provides means for a continuous feed of sugar-catalyst slurry into the first reactor and means for the recovery of excess hydrogen, reaction product and spent catalyst from the last reactor. The present process is most efficient when it is carried out in a series of reactors. This is because the percent of starting material converted into short chain polyols in each reactor is additive, that is if the first reactor produced a product of, for example, 90% short chain polyols and 10% unreacted feed material, then passing this material through a second reactor would convert 90% of the remaining 10% of unreacted product into short chain polyols and give a product of 99% short chain polyols and 1% of unreacted feed material. Although theoretically an infinite number of reactors would be most efficient, however in practice it has been found that 3 or 4 reactors in series gives a product which has both a high percent of conversion, that is, the product contains a high percent of volatile polyols as compared to the total weight of the reaction product and one that contains a high product split, that is, a high percent by weight of glycerin as compared to the percent by weight of materials in the product having a boiling point not higher than glycerin.

Subsidiary reactor

The subsidiary reactor utilized in the present process is positioned to discharge its product into the initial process reactor. The subsidiary reactor generally utilizes a feed of hydrogenolysis product from which desired products, for example glycerin and/or glycols, have been removed.

Hydrogenation catalyst

A hydrogenation catalyst is required in the present process. Although hydrogenation catalysts such as Raney nickel and copper chromite are suited, it is preferred to use a supported nickel catalyst. As is understood in the art of supported nickel catalysts, diatomaceous earth is one suitable support. Preferably the catalyst is in powdered form to provide a large surface area and to facilitate addition of the catalyst into the feed material solution to form a catalyst-feed material slurry prior to entry into the reactor system. The latter slurry insures intimate contact of the feed material and the catalyst and provides an easy means of adding the required amount of catalyst into the process. It is desirable in the present process to utilize a promoted nickel catalyst, that is a nickel catalyst promoted with another metal or metals. With a nickel catalyst, iron and copper have been found to be useful promoters in the present process. One suitable catalyst may consist of nickel supported on diatomaceous earth, (e.g., Johns-Manville Hyflo Super Cel), with a nickel content of about 20% by weight, an iron content of about 1% by weight, and a copper content of about 3% by weight. While none of these percentages is critical, the foregoing example of a suitable catalyst indicates a type of catalyst found useful in the present process. The catalyst may be prepared by suspending the carrier material in a solution of metal nitrates and then adding sodium carbonate. Upon the addition of the carbonate, the metals are precipitated on the carrier material as their hydroxides and carbonates. The carrier and precipitate may then be washed, dried and ground. The ground mixture may be activated by contact with hydrogen in a furnace at about 500° C. The activation reduces the metals to their free state and an activated supported catalyst product is recovered. The amount of catalyst required in the present process is variable and depends upon the activity of the catalyst. Preferably sufficient catalyst is used in the initial carbohydrate feed to provide a weight of nickel ranging from about 0.5% to about 4.0% based on the weight of the carbohydrate material. In the residue stream, that is the stream fed into the subsidiary reactor, sufficient catalyst is preferably used to provide a weight of nickel ranging from about 0.5% to about 4.0% based on the weight of the residue solids. The spent catalyst from the hydrogenolysis process may be recovered from the reaction mixture and reworked by dissolving, precipitating and reactivating. A range of from about 1.0% to about 2.0% by weight of nickel based on the weight of carbohydrate in the feed material or on residue solids in the residue stream generally provides sufficient catalyst to promote the reaction without adding an undesirably high surplus of catalyst which must be recovered from the reaction product.

Cracking additive

The present process utilizes a cracking additive. Cracking or fracturing of the carbon chain of the molecules of feed material is inadequate at normal temperatures and although cracking may be made adequate by high temperatures, as in prior art hydrogenolysis processes, the product split is then lower than desired. Generally oxides, hydroxides and salts of alkaline earth metals may be effectively utilized as cracking additives in the present invention. Calcium oxide, calcium hydroxide, calcium carbonate and salts of calcium and weak acids, such as for example, calcium gluconate and calcium acetate, are eminently suited and readily available. Generally, a concentration of from about 0.25% by weight of the cracking additive (calculated as calcium oxide equivalent) based on the weight of carbohydrate material in the initial feed material or the weight or residue solids in the residue stream is adequate. It is seldom necessary to utilize a cracking additive concentration of over 1.0%. Calcium oxide in a concentration of about 0.5% has been found to perform quite satisfactorily in the present process.

Temperature

A reaction temperature range of a process suited to use in the present invention extends from about 190° C. to about 220° C. in the process reaction system and from about 210° C. to about 230° C. in the subsidiary reactor. The process reaction system must be at a temperature sufficiently high to crack the fresh feed material. Generally at temperatures lower than about 190° C. the reaction is too slow to be practical, and at temperatures higher than 230° C. glycerin, one of the most desirable products, rapidly decomposes and reduces the product split. If a series of reactors are utilized in the process reactor system it is not necessary that each of the process reactors operate at the same temperature providing they are all within the reaction temperature range. In such operations, it has been found that the first process reactor may profitably be operated at a slightly higher temperature, say 210° C. and the remaining process reactors at a slightly lower temperature, say about 200° C. The subsidiary reactor must be maintained at a temperature sufficiently high to crack the depleted feed material from the hydrogenolysis process. The temperature required for cracking the depleted hydrogenolysis product is usually higher than the optimum temperature for cracking fresh feed. Thus the subsidiary reactor generally is maintained at a temperature of between about 210° C. and about 230° C. with a temperature of about 220° C. being found to be quite satisfactory. The initial process reactor generally is maintained between about 200° C. and about 220° C. with a temperature of about 210° C. being eminently satisfactory. The remaining process reactors are usually maintained between about 190° C. and 220° C. with 200° C. being eminently satisfactory. As noted in the reactor section above the efficiency of the present process is generally not noticeably improved if more than four process reactors and one subsidiary reactor are utilized in carrying out the process.

Pressure

A positive hydrogen pressure promotes the reaction and results generally improve as the pressure increases up to about 2000 p.s.i. Above that pressure little improvement is shown, at least insufficient to warrant the special apparatus which would be required. In general pressures between about 1500 and 2000 p.s.i. have been found to give the best results as a practical matter. The use of pressure below about 500 p.s.i. probably would not be warranted in view of the better results which may be obtained in the preferred range.

Product split

The hydrogenolysis product of the reactor system is a mixture of polyols with a minor amount of unreacted carbohydrate feed material. At the present time glycerin is the most valuable individual compound. The present process is designed to obtain a polyol product containing a high percent by weight of glycerin. The hydrogenolysis product from the process reactor system contains uncracked hexitols, pentitols, and tetritols all of which could theoretically be cracked to produce glycerin if cycled to a subsidiary reactor, exposed to cracking conditions adapted to crack the hydrogenolysis product. In considering the efficiency of a hydrogenolysis process, the percent of conversion, that is the amount by weight of volatiles, glycerin and materials having boiling points below glycerin, compared to the amount by weight of starting material, must be considered. However, also important and to be considered in a process for producing a glycerin rich product is the percent by weight of materials converted into products having boiling points below glycerin, that is, material cracked "beyond" glycerin. These materials represent a portion of the product which has lost its potential as a source of glycerin. This factor may be expressed in terms of a product split and expressed:

$$\text{Product split} = \frac{\% \text{ glycerin in reactor product}}{\% \text{ volatiles in reactor product}}$$

"volatiles" being defined as all compounds in the reactor product which are not higher boiling than glycerin. The non-glycerin volatiles are recoverable as products of the hydrogenolysis process, however they are completely lost as far as a potential source of glycerin is concerned.

Reaction time

Preferably the reaction time, that is the residence time of the feed material in the reactors, is between about 1½ and about 6 hours. While times of less than 1½ hours may be utilized the higher temperature required to carry out the reaction in such short time will undesirably decrease the product split. Conversely times of over 6 hours may be utilized, however, the size of the equipment which would be required to carry out the reaction over such an extended period of time would be impractically large. A reaction time of about 2 hours has been found to be eminently satisfactory.

FIGURE 1 is a flow sheet of a typical reactor arrangement, which may be used to carry out the present invention. The sugar or other related carbohydrate starting material and water are introduced into mixing tank 10 in suitable proportions to make a solution of the desired concentration. A reducible sugar is a suitable starting material. Solution from the mixing tank into storage tank 12 in which a diatomaceous earth supported reduced nickel in finely divided form and a cracking additive are added in proportion to give the desired catalyst to sugar and cracking additive to sugar ratio. Storage tank 12 is an agitated tank in which the slurry of catalyst, cracking additive and sugar solution are kept homogeneous. The slurry from storage tank 12 is pumped through a preheater 14 to warm the slurry before introducing it into the reactor system. The slurry is then pumped into the bottom of the first process reactor 16 at a regulated rate.

Hydrogen for the process is initially drawn from a low pressure tank 30 compressed and stored in high pressure storage tank 32. Hydrogen under high pressure is admitted to the first process reactor 16 and to the subsidiary reactor 18 through perforated nozzles 38 and 40 in the lower portion of each reactor. After the system is inititally charged with hydrogen, the main body of hydrogen in the reactors is maintained by the addition of make-up hydrogen from high pressure storage tank 32 as required to replace chemically combined hydrogen and any losses that may have occurred in the system.

As shown in the drawing the process reactor system consists of reactors 16, 20 and 22 and the subsidiary reactor system consists of reactor 18. Preferably the reactors are jacketed and heated to maintain the operating temperature. A line containing the discharge from subsidiary autoclave 18, a line supplying hydrogen, and a line containing a slurry of fresh feed material, water, catalyst, and cracking additive enter the bottom portion of the first process reactor 16. The various components are admixed to form a reaction mixture and rising upwardly pass out the top of reactor 16, flow through pipe 17, and into the bottom of a second process reactor 20. The reaction mixture progresses upwardly through reactor 20 and is drawn off through pipe 21 and conducted to the bottom of the third process reactor 22. It will be understood that the process is not limited to the use of three process reactors, this number is merely shown for the purpose of illustration. The reaction product leaving the last process reactor consists of a solution of the hydrogenolysis products with a small amount of unreacted starting material (the exact amount will depend upon the extent of hydrogenolysis in the system), suspended spent catalyst and spent cracking additive, passes through pipe 23 to a gas and liquid separator 24 in which free hydrogen is separated from the product and recovered. The slurry is drawn from separator 24, reduced to atmospheric pressure and conducted to separator 26 wherein the spent catalyst is separated from the reaction product. The slurry is next treated to remove ionizable material by passing the slurry through an ion exchange column 27 suitably comprised of a bed of cation exchange material and a bed of anion exchange material. The product is then conducted to water separator 28 where the bulk of the water is removed from the reaction product. The reaction product from the water separation is next treated in a distillation column 29 to separate a fraction containing components having a boiling point above that of glycerin. This high boiling point fraction is conducted through pipe 33 to storage tank 34 wherein it is mixed with a suitable amount of water, hydrogenation catalyst and cracking additive to form a feed slurry. The formed feed slurry is led through pipe 36 into the bottom portion of subsidiary reactor 18 and fed at a selected rate through perforated nozzle 38. A supply of hydrogen from high pressure supply tank 32 enters the bottom portion of subsidiary reactor 18 and reacts with the feed slurry from pipe 36. The hydrogenolysis product from subsidiary reactor 18 is discharged through pipe 19 into the lower portion of the initial process reactor 16.

The invention will be further described in connection with the following examples. These examples are not to be taken as limiting the invention to the specific conditions recited.

Each of the following examples, except Example 1, were carried out using equipment such as that just described and in which reactors having a 3⅝₁₆ inch inside diameter and 6 feet high were employed. The fresh feed material was a 50% by weight solution of invert sugar. The fresh feed material was made into a slurry by adding a diatomaceous earth supported reduced nicked catalyst promoted with iron and copper in proportions to give 1.5% by weight of nickel based on the weight of sugar and a cracking additive consisting of 05% by weight of calcium oxide based on the weight of sugar. This slurry was continuously fed into the bottom of the first of four process reactors at a rate to yield a conversion of 65%, that is 65% by weight of the sugar entering the reactor system would at the time of leaving the system be converted to compounds having boiling points equal to or below that of glycerin.

In Example 1, a bank of four reactors was utilized to produce a hydrogenolysis product. The product from the reactors was separated from residual catalyst and hydrogen and substantially freed of ionizable materials by treatment with cation and anion exchange materials. Glycerin and glycols were then separated from the product leaving a high boiling carbohydrate hydrogenolysis residue. The residue, depleted in glycerin and glycols, was utilized as a residue feed material in Examples 2 through 6 which are illustrative of the present invention. In order to obtain a 65% conversion the residence time, that is the average time a molecule of feed material spends in the reactor system, was adjusted to 2.0 hours. At a 65% conversion the product split, that is the percent by weight of glycerin compared to the percent by weight of compounds not higher boiling than glycerin, was also 65%. The initial process reactor was heated to 210° C. and the remaining three process reactors heated to 200° C. A continuous flow of hydrogen under a maintained pressure of 2000 p.s.i. was directed through the lower portion of the initial process reactor during the reaction.

In Example 2, a reactor system consisting of four process reactors and one subsidiary reactor were utilized. The high boiling residue from run 1, that is the 35% of the product material that was not converted to glycerin or a lighter boiling component, was utilized as an additional hydrogenolysis feed material. The latter residue feed material was mixed with catalyst and cracking additive in similar proportions to the amounts of catalyst and cracking additive utilized in run 1 except that the amounts were calculated on the weight of residue solids instead of the weight of sugar. The residue feed was then fed into the bottom portion of the subsidiary reactor. The discharge from the subsidiary reactor was fed into the bottom portion of the first process reactor. A slurry feed of fresh feed molasses, catalyst and lime similar to the feed slurry in Example 1, was also fed into the bottom portion of the first process reactor. The feed through the process reactor was adjusted to yield a 65% conversion. The residence time at this conversion level was found to be 2.7 hours. At 65% conversion the product split was 58%. The subsidiary reactor was heated to 210° C. and the initial process reactor to 210° C. and the remaining process reactors at 200° C. A continuous flow of hydrogen under a maintained pressure of 2000 p.s.i. was directed into the reactor system, one hydrogen feed line directed into the lower portion of the subsidiary reactor and one hydrogen feed line directed into the lower portion of the initial process reactor. The hydrogen was fed into each of the reactors by means of sparger tubes. The high boiling residue from Example 2, 35% by weight of the hydrogenolysis product which was not converted to glycerin or a lighter boiling component was utilized as the cycled feed into the subsidiary reactor in Example 3. Examples 3 through 6 were conducted in a manner similar to Example 2.

| Ex. No. | Reactor Temperatures | | | Residence Time for 65% Conversion, Hrs. | Product Split at 65% Conversion |
|---|---|---|---|---|---|
| | Subsidiary Reactor | Initial Process | Remaining Process | | |
| 1 | | 210 | 200 | 2.0 | 0.65 |
| 2 | 210 | 210 | 200 | 2.7 | 0.58 |
| 3 | 210 | 210 | 200 | 3.1 | 0.56 |
| 4 | 215 | 210 | 200 | 2.9 | 0.56 |
| 5 | 215 | 210 | 200 | 2.9 | 0.56 |
| 6 | 215 | 210 | 200 | 2.8 | 0.56 |

What is claimed is:
1. A process for the continuous hydrogenolysis of a reducible sugar which comprises the steps of
reacting a carbohydrate hydrogenolysis process residue depleted of glycerin and glycols with hydrogen in the presence of a cracking additive and a hydrogenation catalyst to form a first hydrogenolysis product,
mixing the said product with a feed of reducible sugar and reacting the formed mixture with hydrogen in presence of a cracking additive and a hydrogenation catalyst to form a second hydrogenolysis product, and
separating glycerin and glycols from the latter product leaving another carbohydrate hydrogenolysis process residue.
2. The process of claim 1 wherein the reducible sugar is glucose.
3. The process of claim 1 wherein the reactions are carried out under a pressure of at least 500 p.s.i.
4. The process of claim 1 wherein the catalyst is reduced nickel promoted by iron.
5. The process of claim 4 wherein the nickel in the catalyst is present in an amount of between 0.5 and about 4.0% by weight of the reducible sugar.
6. The process of claim 1 wherein the cracking additive is selected from the group consisting of calcium oxide, calcium hydroxide, calcium carbonate, and salts of calcium and weak acids.
7. The process of claim 1 wherein the cracking additive is present in an amount of between about 0.25 and 1.0% of the weight of the reducible sugar.
8. The process for the continuous hydrogenolysis of a reducible sugar which comprises the steps of
reacting a continuous feed of reducible sugar and hydrogen
in a process reactor system
in the presence of a hydrogenation catalyst
and a cracking additive
to produce a first hydrogenolysis product
continuously removing said hydrogenolysis reaction product from said process reactor system,
separating glycerin and glycols from said product,
reacting said product with hydrogen
in a subsidiary reactor
in the presence of a hydrogenation catalyst
and a cracking additive
to produce a second hydrogenolysis product, and
feeding said formed second hydrogenolysis product into said process reactor into which reducible sugar is being fed for hydrogenolysis.
9. A process for the continuous hydrogenolysis of a reducible sugar which comprises the steps of
reacting at a temperature between about 210° C. and about 230° C. and a pressure of at least 500 pounds per square inch, a carbohydrate hydrogenolysis process residue depleted of glycerin and glycols with hydrogen in the presence of a cracking additive and a hydrogenation catalyst to form a first hydrogenolysis product,
mixing the said product with a feed of reducible sugar and reacting the formed mixture with hydrogen under a pressure of greater than about 500 p.s.i and at a temperature between about 190° C. and about 220° C., in the presence of a cracking additive and a hydrogenation catalyst to form a second hydrogenolysis product, and
separating glycerin and glycols from the latter product leaving another carbohydrate hydrogenolysis process residue.
10. The process for the continuous hydrogenolysis of a reducible sugar which comprises the steps of
reacting at a temperature between about 190 and 220° C. and a pressure of at least 500 pounds per square inch, a continuous feed of reducible sugar and hydrogen
in a process reactor system
in the presence of a hydrogenation catalyst
and a cracking additive
to produce a first hydrogenolysis product
continuously removing said hydrogenolysis reaction product from said process reactor system,
separating glycerin and glycols from said product,
reacting said product with hydrogen under a pressure of greater than about 500 p.s.i. and at a temperature between about 210° C. and about 230° C.,
in a subsidiary reactor
in the presence of a hydrogenation catalyst
and a cracking additive
to produce a second hydrogenolysis product, and
feeding said formed second hydrogenolysis product into said process reactor into which reducible sugar is being fed for hydrogenolysis.

References Cited

UNITED STATES PATENTS 2,965,679 12/1960 Condradin et al. _____ 260—635
3,030,429 4/1962 Conradin et al. _____ 260—635

OTHER REFERENCES

A.P.C. application of Giulio Natta et al., Ser. No. 295,616.

LEON ZITVER, *Primary Examiner.*

HAROLD G. MOORE, *Examiner.*

M. B. ROBERTO, G. A. MILWICK, J. E. EVANS, *Assistant Examiners.*

UNITED STATES PATENT OFFICE
CERTIFICATE OF CORRECTION

Patent No. 3,341,609                September 12, 1967

Leo Kasehagen

It is hereby certified that error appears in the above numbered patent requiring correction and that the said Letters Patent should read as corrected below.

Column 6, line 28, for "05%" read -- 0.5% --.

Signed and sealed this 11th day of March 1969.

(SEAL)
Attest:

Edward M. Fletcher, Jr.
Attesting Officer

EDWARD J. BRENNER
Commissioner of Patents